(12) United States Patent
Yang et al.

(10) Patent No.: US 7,711,330 B2
(45) Date of Patent: May 4, 2010

(54) METHOD AND APPARATUS FOR TRANSMITTING/RECEIVING SIGNALS IN MULTIPLE INPUT MULTIPLE OUTPUT WIRELESS COMMUNICATION SYSTEM EMPLOYING BEAM FORMING SCHEME

(75) Inventors: Ho Yang, Yongin-si (KR); Hyoung-Woon Park, Seongnam-si (KR); Ho-Jin Kim, Seoul (KR); Ashish Pandharipande, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 661 days.

(21) Appl. No.: 11/260,852

(22) Filed: Oct. 27, 2005

(65) Prior Publication Data

US 2006/0104382 A1    May 18, 2006

(30) Foreign Application Priority Data

Oct. 27, 2004   (KR) ...................... 10-2004-0086383

(51) Int. Cl.
*H03C 7/02*    (2006.01)

(52) U.S. Cl. ........................ 455/101; 455/102; 455/103; 455/562.1; 375/267; 375/347; 370/334; 370/335

(58) Field of Classification Search ............... 255/277.1, 255/424, 425, 456.5, 456.6, 550.1, 575.1, 255/13.1, 24, 63.1, 63.4, 562.1, 575.7, 69, 255/553.1, 134, 135, 101, 102, 103, 562.2, 255/277.2, 278, 279, 126; 375/267, 299, 375/221, 262, 295, 140; 370/334, 339, 328, 370/342, 335, 203; 342/154, 354, 432
See application file for complete search history.

(56) References Cited

U.S. PATENT DOCUMENTS

| 7,139,324 | B1* | 11/2006 | Ylitalo et al. ............... 375/267 |
| 2002/0080732 | A1* | 6/2002 | Feria et al. .................. 370/320 |
| 2002/0085643 | A1* | 7/2002 | Kitchener et al. .......... 375/267 |
| 2003/0190897 | A1* | 10/2003 | Lei et al. ..................... 455/101 |
| 2004/0002364 | A1* | 1/2004 | Trikkonen et al. ....... 455/562.1 |
| 2004/0082356 | A1* | 4/2004 | Walton et al. ............... 455/522 |

(Continued)

OTHER PUBLICATIONS

Sampath et al., *Linear Precoding for Space-Time Coded Systems with Known Fading Correlations*, Jun. 2002, pp. 239-241, IEEE Communication Letters, vol. 6, No. 6.

(Continued)

*Primary Examiner*—Duc Nguyen
*Assistant Examiner*—Charles Chow
(74) *Attorney, Agent, or Firm*—NSIP Law (57) ABSTRACT

Disclosed is a method and an apparatus for transmitting/receiving signals in an multiple input multiple output (MIMO) wireless communication system. The method and apparatus including beam forming of a reference signal while predetermined codes are mapped on a one-to-one basis to each of a plurality of beams available for the transmitter and thereafter transmitting the beam-formed reference signal to a receiver. Also, if information representing an optimum beam, which maximizes reception performance, is received from the receiver, beam forming of data signals is performed by means of a beam corresponding to the information on the optimum beam and the beam-formed data signals are transmitted to the receiver. Therefore, it is possible to apply a beam forming scheme having minimum operation complexity and maximizing reception performance.

6 Claims, 8 Drawing Sheets

U.S. PATENT DOCUMENTS

| | | | |
|---|---|---|---|
| 2005/0078761 A1* | 4/2005 | Hottinen et al. | 375/267 |
| 2005/0157684 A1* | 7/2005 | Ylitalo et al. | 370/334 |
| 2005/0157807 A1* | 7/2005 | Shim et al. | 375/267 |
| 2006/0104382 A1* | 5/2006 | Yang et al. | 375/267 |
| 2006/0209749 A1* | 9/2006 | Blanz et al. | 370/328 |
| 2006/0265470 A1* | 11/2006 | Rolia et al. | 709/217 |
| 2007/0165739 A1* | 7/2007 | Hottinen et al. | 375/267 |
| 2007/0223402 A1* | 9/2007 | Waxman | 370/277 |
| 2007/0238430 A1* | 10/2007 | Himayat et al. | 455/226.3 |
| 2008/0013638 A1* | 1/2008 | Walton et al. | 375/260 |
| 2008/0102881 A1* | 5/2008 | Han et al. | 455/522 |
| 2008/0108310 A1* | 5/2008 | Tong et al. | 455/69 |

OTHER PUBLICATIONS

Sampath et al., *Linear Precoding for Space-Time Coded Systems with Known Fading Correlations*, Dec. 2001, pp. 246-251, IEEE.

Alamouti, A Simple Transmit Diversity Technique for Wireless Communications, IEEE Journal on Select Areas in Communications, vol. 16, No. 8, Oct. 1998.

Jongren et al., Combining Beamforming and Orthogonal Space-Time Block Coding, IEEE Transactions on Information Theory, vol. 48, No. 3, Mar. 2002.

Sampath et al., Linear Precoding for Space-Time Coded Systems with Known Fading Correlations, 2001 IEEE.

* cited by examiner

METHOD AND APPARATUS FOR TRANSMITTING/RECEIVING SIGNALS IN MULTIPLE INPUT MULTIPLE OUTPUT WIRELESS COMMUNICATION SYSTEM EMPLOYING BEAM FORMING SCHEME

PRIORITY

This application claims priority to applications entitled "Method and Apparatus for Transmitting/Receiving Signals in Multiple Input Multiple Output Wireless Communication System Employing Beam Forming Scheme" filed in the Korean Intellectual Property Office on Oct. 27, 2004 and assigned Serial No. 2004-86383, the contents of which are herein incorporated by reference.

BACKGROUND OF THE INVENTION

1. Field of the Invention

The present invention relates to a multiple input multiple output (MIMO) or multiple input single output (MISO) wireless communication system (hereinafter referred to as a "MIMO/MISO wireless communication system"), and more particularly to a method and an apparatus for beam forming signals by means of a beam corresponding to an optimum beam, which maximizes performance of a transmitter, to transmit and/or receive the beam-formed signals in an MIMO/MISO wireless communication system employing a beam forming scheme and a space time block coding (STBC) scheme.

2. Description of the Related Art

Next generation wireless communication systems have evolved from voice only communication systems into packet service communication systems that transmits burst packet data to a plurality of user terminals (UTs). Packet service communication systems have been designed to be adapted for transmission of mass data. Moreover, packet service communication systems are being further developed into high-speed packet services.

However, in order to provide a high-speed packet service, a peak throughput as well as an average throughput must be optimized for a smooth transmission of packet data as well as circuit data such as voice service data.

In providing a high-speed packet service, it is also important to increase a data rate and to enhance transmission reliability. In this regard, a multiple antenna scheme is as a means to increase the data rate and to enhance the transmission reliability. The multiple antenna scheme is capable of overcoming limitations on bandwidth resources in a frequency domain by utilizing a space domain.

In addition, a smart antenna schemes in which signals are received correspondingly to a predetermined direction of arrival (DOA) to perform beam forming of the received signals when there is a correlation between receive antennas. Smart antenna schemes for reception are known as receive beam forming schemes and are suitable to receive uplink signals, that is, signals transmitted from a UT to a base station (hereinafter referred to as BS), in the BS rather than the UT.

In other words, although it is difficult to provide a UT with a plurality of receive antennas due to limitations such as hardware minimization and/or manufacturing costs, the BS is can be easily equipped with a plurality of receive antennas without having to worry about hardware minimization and/or manufacturing costs so it is preferable to apply the smart antenna scheme to the BS.

Several schemes exist for minimizing error. For example, a minimum mean square error MMSE scheme is optimal for maximizing a signal-to-interference-and-noise ratio, (SINR and for maximizing a signal to noise ratio (SNR), a maximum ratio combining (MRC) scheme is optimal.

When signals are transmitted using a plurality of transmit antennas on a transmitter side, that is, downlink signals are transmitted from the BS to the UTs, a transmit beam forming scheme can be used to enhance transmission reliability. In a case of using a transmit beam forming scheme based on the MRC scheme, the SNR is optimized and the same effect as a pre-distortion filter generated by principal eigen vectors of a channel is acquired.

It is possible for the transmit beam forming scheme to provide diversity and array gains and to maximize the transmission reliability on the assumption that exact channel estimation is performed on a receiver side and there is no error in signals fed back from the receiver side to the transmitter side. However, although satisfying the assumption that the exact channel estimation is performed on the receiver side, the transmit beam forming scheme having to perform a complicated eigen-decomposition on the transmitter or receiver side and also suffers because channel information must be fed back from the receiver to the transmitter.

Channel reciprocity, an approach used for preventing feedback of channel status information in a time division duplex (TDD) communication system, is applied in a case using an eigen-beam forming scheme and a directional-beam forming scheme. That is, in using the eigen-beam forming and directional-beam forming schemes, complexity caused by the feedback of channel status information can be minimized because it is possible to analogize, using the channel status of only one link (downlink or uplink), the channel status of the other link (uplink or downlink) when it can be supposed that the downlink channel status is the same as the uplink channel status, in other words, when the downlink and the uplink channels have channel reciprocity, as in the TDD communication system.

However, even in the TDD communication system, the channel reciprocity collapses due to different transmission and reception device characteristics from each other, so efficient calibration for considering the channel statuses is necessary.

Meanwhile, the STBC scheme is a transmission scheme considering a rich scattering channel environment, and supposes that two transmit antennas are used on a transmitter side. Since such an STBC scheme is already well known in the art, a detailed description thereof will be omitted herein (see S. M. Alamouti, "A Simple Transmit Diversity Technique For Wireless Communications," IEEE Journal of Selected Areas in Communications, Vol. 16, pp. 1451-1458, October 1988).

The STBC scheme can be comparatively simply applied to a transmitter side and easily realize a receiver structure. On this account, it has been already adopted as an option standard in a 3GPP ($3^{rd}$ Generation Partnership Project) standard. However, the STBC scheme suffers because its performance is limited because a correlation between transmit antennas.

In addition, in order to compensate for imperfect channel prediction and imperfect information feedback to a transmitter side, an STBC-beam forming scheme combining the STBC and beam forming schemes with each other has been proposed. For example, see G. Jongren and M. Skoglund, "Combining Beamforming and Orthogonal Space-Time Block Coding," IEEE Trans. Information Theory, Vol. 48, No. 3, pp. 611-627, March 2000. Hereinafter, the STBC-beam forming scheme will be described with reference to FIG. 1.

Figure 1:
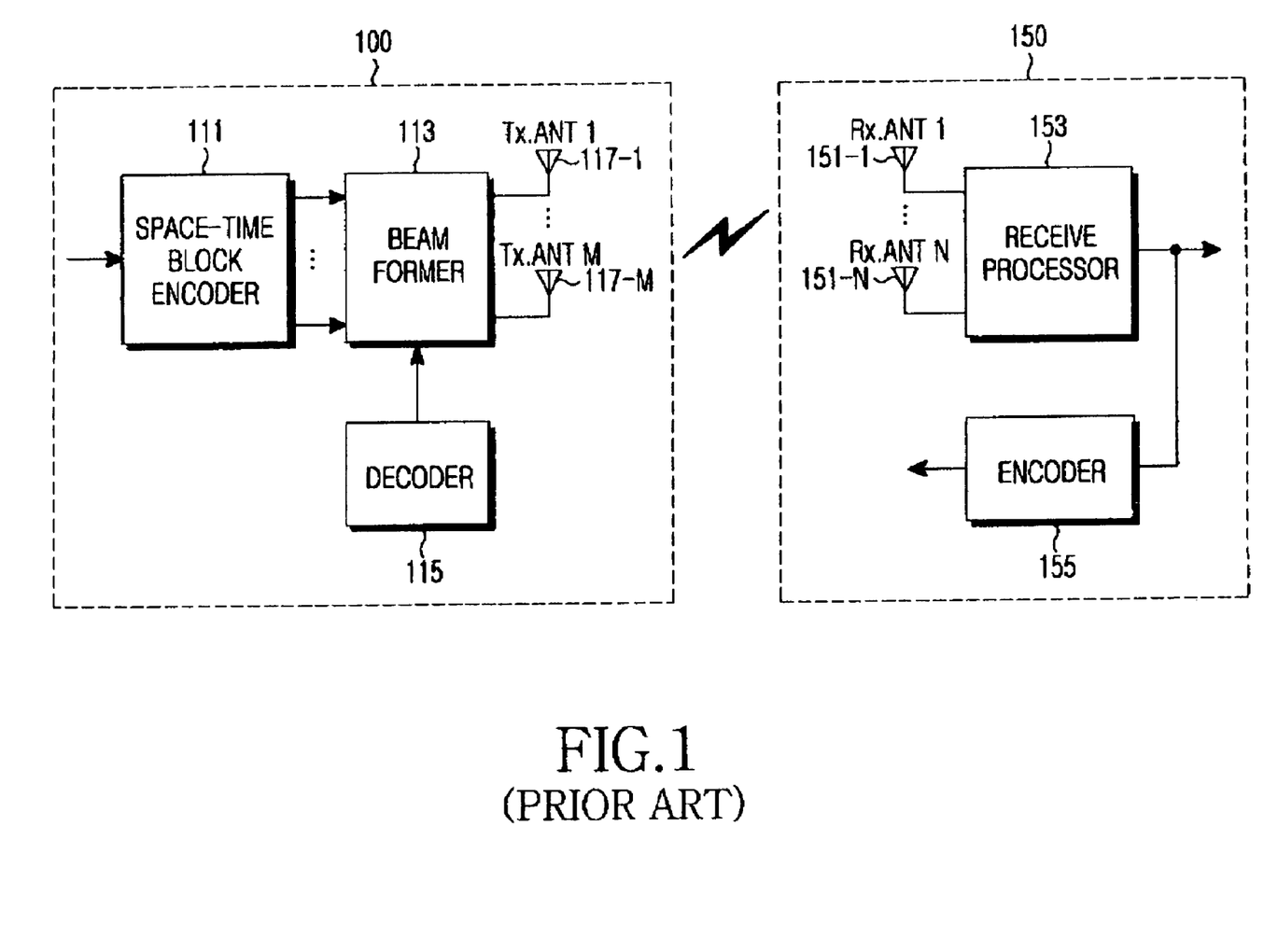
FIG. 1 is a block diagram illustrating a structure of an MIMO wireless communication system employing a common STBC-beam forming scheme.

FIG. 1 is a block diagram illustrating a structure of an MIMO wireless communication system employing a common STBC-beam forming scheme.

Referring to FIG. 1, the MIMO wireless communication system includes a transmitter 100 and a receiver 150. The transmitter 100 includes a space-time block encoder 111, a beam former 113, a decoder 115 and a plurality of transmit antennas (Tx.ANT) 117-1, . . . , 117-M. The receiver 150 includes a plurality of receive antennas (Rx.ANT) 151-1, . . . , 151-N, a receive processor 153 and an encoder 155.

First, if data to be transmitted from the transmitter 100 to the receiver 150 occurs, the data is transferred to the space-time block encoder 111, and the space-time block encoder 111 encodes the data using an STBC scheme and then outputs the encoded data to the beam former 113. The beam former 113 inputs the signals outputted from the space-time block encoder 111 to perform beam forming of the signals by means of a beam corresponding to beam information outputted from the decoder 115 and then transmits the beam-formed signals to the receiver 150 through the transmit antennas 117-1, . . . , 117-M. The decoder 115 decodes beam information fed back from the receiver 150 and then outputs the decoded beam information to the beam former 113. The fed back beam information is quantization information and will be described later in detail and for the sake of clarity will not described in detail at this point. Moreover, it is noted that a signal reception path from the receiver 150 to the decoder 115 is not shown separately in the drawing.

Noises such as additive white Gaussian noise (AWGN) are added to the signals transmitted from the transmitter 100 while the signals pass through a multipath channel and then the signals with the noises added thereto are received by the receiver 150 through the receive antennas 151-1, . . . , 151-N. The signals received through the receive antennas 151-1, . . . , 151-N are transferred to the receive processor 153 which performs processing of the received signals to output channel information resulted from the processing of the received signals to the encoder 155.

The encoder 155 quantizes the channel information outputted from the receive processor 153 in a predetermined quantization scheme and then transmits the quantized channel information to the transmitter 100. It is also noted that a signal transmission path from the encoder 155 to the transmitter 100 is not shown separately in the drawing.

Research is being undertaken to improve the performance of the STBC-beam forming scheme by individually improving the STBC scheme and the beam forming scheme. As a result of this, an optimum pre-encoder for the space-time block encoder has been proposed, and such an optimum pre-encoder has proved to be implemented by an eigen-beam former for an orthogonal space-time block encoder. For example, see H. Sampath and A. Paulraj, "Linear Precoding for Space-Time Coded Systems with Known Fading Correlations," IEEE Communications Letters, Vol. 6, No. 6, pp. 239-241, June 2002.

Although the research has been undertaken to improve the STBC-beam forming scheme, the receiver must still feedback the channel information to the transmitter and eigen-analysis for the channel information is necessary.

Hereinafter, a description will be given for a scheme combining a beam scanning scheme and the STBC-beam forming scheme with each other with reference to FIG. 2.

Figure 2:
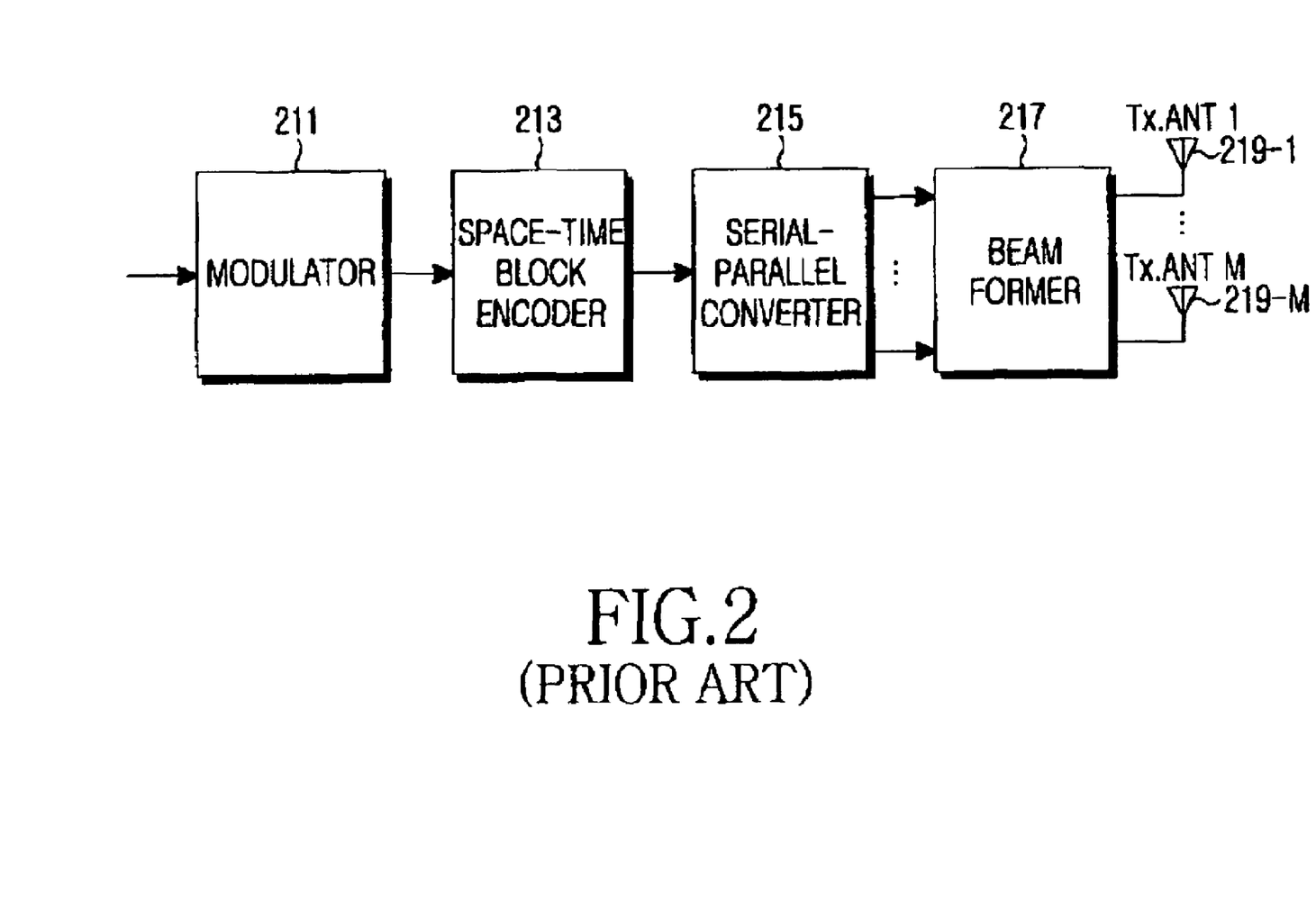
FIG. 2 is a block diagram illustrating a structure of a transmitter in an MIMO wireless communication system employing a combined scheme of common beam scanning and STBC-beam forming schemes.

FIG. 2 is a block diagram illustrating a structure of a transmitter in an MIMO wireless communication system employing a combined scheme of common beam scanning and STBC-beam forming schemes.

Referring to FIG. 2, the transmitter in the MIMO wireless communication system includes a modulator 211, a space-time block encoder 213, a serial-to-parallel converter 215, a beam former 217 and a plurality of transmit antennas 219-1, . . . , 219-M.

First, if it is necessary to transmit data from the transmitter to a receiver, the data is transferred to the modulator 211 which modulates the data using a predetermined modulation scheme and then outputs modulated data signals to the space-time block encoder 213. The space-time block encoder 213 encodes the signals outputted from the modulator 211 using an STBC scheme and then outputs the encoded signals to the serial-to-parallel converter 215. The serial-to-parallel converter 215 parallel-converts the signals outputted from the space-time block encoder 213 and then outputs the converted signals to the beam former 217. The beam former 217 inputs the signals outputted from the serial-to-parallel converter 215, performs beam forming of the signals by means of a beam corresponding to predetermined beam information and then transmits the beam-formed signals to the receiver through the transmit antennas 219-1, . . . , 219-M. Here, the beam information is information to which the beam scanning scheme is applied, that is, to which a channel spatial gain pattern (CSGP) of signals received on the transmitter side is considered, and is generated in consideration of beams having energy above a predetermined threshold value.

However, even though the beam scanning scheme is used together with the STBC-beam forming scheme, the STBC-beam forming scheme still suffers because beams related to unnecessary interference signals must be excluded from the beams having energy above the predetermined threshold value, and satisfactory performance is ensured only when impractical assumptions such as the channel reciprocity are satisfied.

SUMMARY OF THE INVENTION

Accordingly, the present invention has been made to solve at least the above-mentioned problems occurring in the prior art, and an object of the present invention is to provide a method and an apparatus for performing beam forming of signals by means of a beam corresponding to an optimum beam, which maximizes performance of a transmitter, to transmit/receive the beam-formed signals in an multiple input multiple output/multiple input multiple output (MIMO/MISO) wireless communication system employing a beam forming scheme and an space time block coding (STBC) scheme.

A further object of the present invention is to provide a method and an apparatus for transmitting/receiving signals by using an optimum beam and a sub-optimum beam having directionality (hereinafter referred to as an "optimum beam" and "sub-optimum beam" without the phrase "having directionality", an optimum condition) in an MIMO wireless communication system employing a beam forming scheme and an STBC scheme, thereby minimizing operation complexity.

In order to accomplish these objects, in accordance with one aspect of the present invention, there is provided an apparatus for transmitting signals by using a beam forming scheme in a transmitter of an MIMO/MISO wireless communication system, the apparatus including a beam former for performing beam forming of a reference signal while mapping predetermined codes on a one-to-one basis of a plurality of beams available for the transmitter to transmit the beam-formed reference signal to a receiver, and performing beam forming of data signals by means of a beam corresponding to information on an optimum beam, which is provided according to prescribed controls, to transmit the beam-formed data signals to the receiver; and a decoder for receiving signals from the receiver to decode the received signals and transmit the information on the optimum beam, which maximizes reception performance, from among the beams to the beam former.

In accordance with another aspect of the present invention, there is provided an apparatus for transmitting signals by using a beam forming scheme and an STBC scheme in a transmitter of an MIMO/MISO wireless communication system, the apparatus including a space-time block encoder for encoding data signals in the STBC scheme if the data signals to be transmitted exist; a beam former for performing beam forming of a reference signal while mapping predetermined codes one-to-one basis to each of a plurality of beams available for the transmitter to transmit the beam-formed reference signal to a receiver, and performing beam forming of the space-time block-encoded data signals by means of beams corresponding to information on an optimum beam and information on a sub-optimum beam, which are provided according to prescribed controls, to transmit the beam-formed data signals to the receiver; and a decoder for receiving signals from the receiver to decode the received signals and transmit the information on the optimum beam and the sub-optimum beam, which maximize reception performance, from among the beams to the beam former.

In accordance with another aspect of the present invention, there is provided an apparatus for receiving signals transmitted using a beam forming scheme in a receiver of an MIMO/MISO wireless communication system, the apparatus including a receive processor for receiving a reference signal from a transmitter to correlate the reference signal with codes pre-mapped on a one-to-one basis to each of a plurality of beams available for the transmitter, respectively and select a beam mapped to a code, which has a maximum correlation value from among correlation values correlated with respect to the respective codes, as an optimum beam; and an encoder for feeding back information representing the selected optimum beam to the transmitter.

In accordance with another aspect of the present invention, there is provided an apparatus for receiving signals transmitted using a beam forming scheme and an STBC scheme in a receiver of an MIMO/MISO wireless communication system, the apparatus including a receive processor for receiving a reference signal from a transmitter to correlate the reference signal with codes pre-mapped on a one-to-one basis to each of a plurality of beams available for the transmitter, respectively, select a beam mapped to a first code, which has a maximum correlation value from among correlation values correlated with respect to the respective codes, as an optimum beam and select a beam mapped a second code, which exhibits a peak correlation value and has a correlation value below the first code and a predetermined threshold correlation value from among the correlation values excluding the maximum correlation value, as a sub-optimum beam; and an encoder for feeding back information representing the selected optimum beam and sub-optimum beam to the transmitter.

In order to accomplish the above-mentioned objects, in accordance with another aspect of the present invention, there is provided a method for transmitting signals by using a beam forming scheme in a transmitter of an MIMO/MISO wireless communication system, the method including performing beam forming of a reference signal while mapping predetermined codes on a one-to-one basis to each of a plurality of beams available for the transmitter to then transmit the beam-formed reference signal to a receiver; and if information representing an optimum beam, which maximizes reception performance, is received from the receiver, performing beam of forming data signals by means of a beam corresponding to the information on the optimum beam to transmit the beam-formed data signals to the receiver.

In accordance with another aspect of the present invention, there is provided a method for transmitting signals by using a beam forming scheme and an STBC scheme in a transmitter of an MIMO/MISO wireless communication system, the method including performing beam forming of a reference signal while mapping predetermined codes on a one-to-one basis to each of a plurality of beams available for the transmitter to then transmit the beam-formed reference signal to a receiver; receiving information on an optimum beam and a sub-optimum beam, which maximize reception performance, from the receiver; and if the data signals to be transmitted exist, encoding data signals in the STBC scheme to then perform beam forming on the encoded data signals by means of beams corresponding to the information on the optimum beam and the sub-optimum beam and transmit the beam-formed data signals to the receiver.

In accordance with another aspect of the present invention, there is provided a method for receiving signals transmitted using a beam forming scheme in a receiver of an MIMO/MISO wireless communication system, the method including correlating the reference signal with codes pre-mapped on a one-to-one basis to each of a plurality of beams available for the transmitter, respectively, if a reference signal is received; selecting a beam mapped to a code, which has a maximum correlation value from among correlation values correlated with respect to the respective codes, as an optimum beam; and feeding back information representing the selected optimum beam to the transmitter.

In accordance with another aspect of the present invention, there is provided a method for receiving signals transmitted using a beam forming scheme and an STBC scheme in a receiver of an MIMO/MISO wireless communication system, the method including correlating the reference signal with codes pre-mapped on a one-to-one basis to each of a plurality of beams available for the transmitter, respectively, if a reference signal; selecting a beam mapped to a first code, which has a maximum correlation value from among correlation values correlated with respect to the respective codes, as an optimum beam and selecting a beam mapped a second code, which exhibits a peak correlation value and has a correlation value below the first code and a predetermined threshold correlation value from among the correlation values excluding the maximum correlation value, as a sub-optimum beam; and feeding back information representing the selected optimum beam and sub-optimum beam to the transmitter.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

The present invention proposes a scheme for performing beam forming of signals to be transmitted to a receiver, for example, a user terminal (UT) by using a beam corresponding to optimum beam information fed back from the UT to transmit the beam-formed signals to the UT in a transmitter, for example, a BS of an MIMO/MISO wireless communication system when a beam forming scheme and an STBC scheme are used. In particularly, the present invention transmits all beams used in the BS, to each of which orthogonal codes are mapped on a one-to-one basis, to the UT so as to enable the UT to select a beam, which is optimal to its own signal reception, thereby maximizing reception performance. The present invention also includes a scheme for beam forming of signals to be transmitted to the UT by using the optimum beam and a sub-optimum beam to transmit the beam-formed signals to the UT in a case of using an STBC-beam forming scheme, that is, a combined scheme of the beam forming scheme and the STBC scheme.

A description will first be given for a structure of an MIMO wireless communication system employing an STBC-beam forming scheme with reference to FIG. 3.

Figure 3:
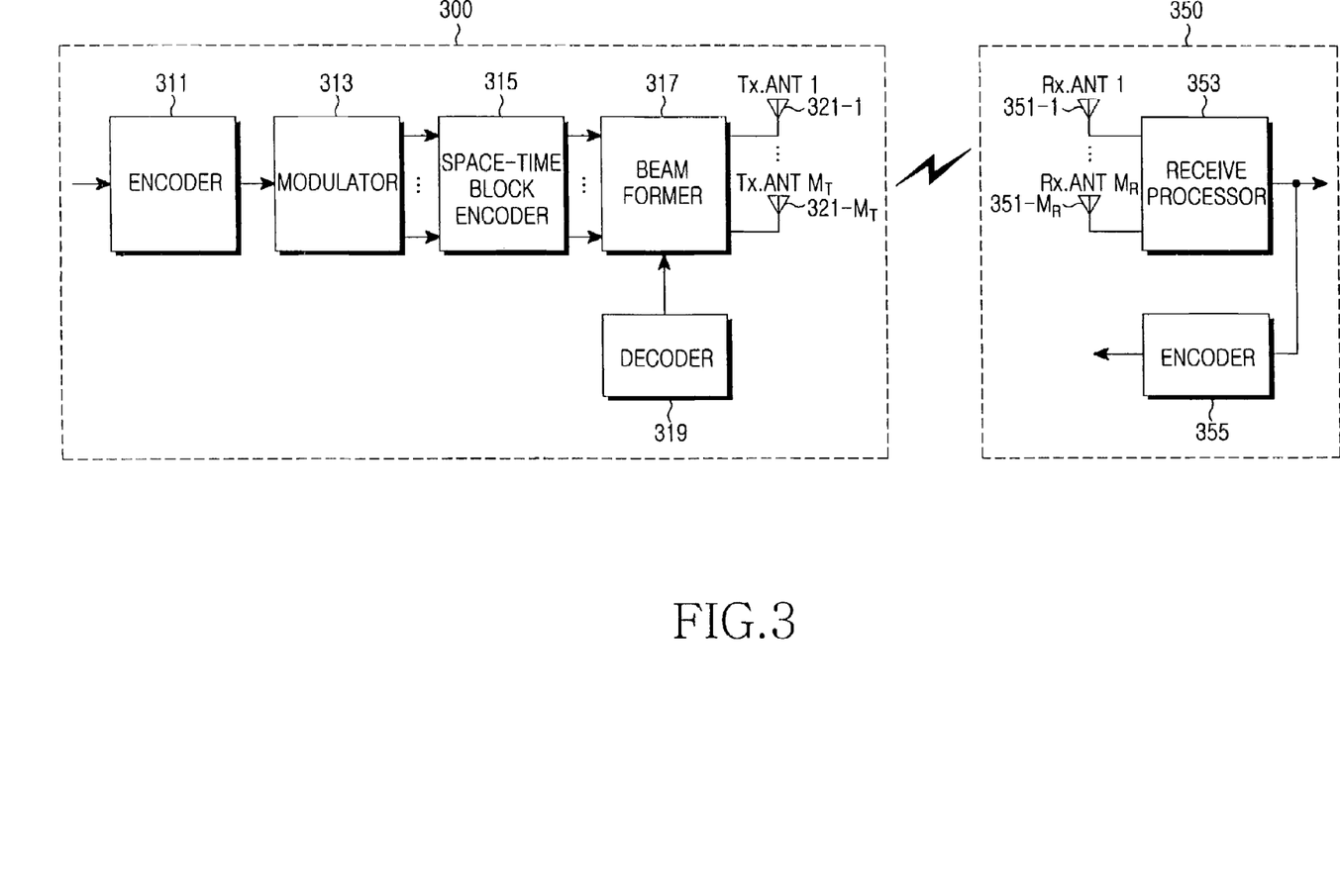
FIG. 3 is a block diagram illustrating a structure of an MIMO wireless communication system employing an STBC-beam forming scheme, which performs various functions according to a preferred embodiment of the present invention.

FIG. 3 is a block diagram illustrating a structure of an MIMO wireless communication system employing an STBC-beam forming scheme, which performs various functions in accordance with a preferred embodiment of the present invention.

Prior to an explanation of FIG. 3, it is noted that a plurality of antennas are optionally provided on one side or both sides of a BS and a UT in order to transmit and/or receive data at high speed in a wireless communication system. Also, for the high-speed data transmission through the plurality of antennas, an antenna processing scheme is so defined as to correspond to the UT's requirements and channel characteristics. For example, when both the BS and the UT are provided with the plurality of antennas and the UT targets the high-speed data transmission, the MIMO scheme is preferably used as the antenna processing scheme. However, when the UT targets stable data transmission regardless of the number of antennas which the UT has, it is preferable to use a beam forming scheme, a transmit diversity scheme and the like as the antenna processing scheme. That is, by selecting and using the antenna processing scheme such that it corresponds to a data transmission characteristic which the UT targets in the wireless communication system, the overall performance of the wireless communication system can be improved.

Referring to FIG. 3, the MIMO wireless communication system includes a transmitter 300 and a receiver 350. The transmitter 300 includes an encoder 311, a modulator 313, a space-time block encoder 315, a beam former 317, a decoder 319 and a plurality of transmit antennas (Tx.ANT) 321-1, ..., 321-$M_T$, that is, a first transmit antenna (Tx.ANT 1) 321-1 to an $M_T$-th transmit antenna (Tx.ANT $M_T$) 321-$M_T$. The receiver 350 includes a plurality of receive antennas (Rx.ANT) 351-1, ..., 351-$M_R$, that is, a first receive antenna (Rx.ANT 1) 351-1 to an MR-th receive antenna (Rx.ANT $M_R$), a receive processor 353 and an encoder 355.

First, if data to be transmitted from the transmitter 300 to the receiver 350 exists, the data is transferred to the encoder 311, and the encoder 311 encodes the data in a predetermined encoding scheme to then output the encoded data signals to the modulator 313. The modulator 313 inputs the signals outputted from the encoder 311 and modulates the signals using a predetermined modulation scheme and then outputs the modulated signals to the space-time block encoder 315. The space-time block encoder 315 encodes the modulated signals in the STBC scheme to then outputs the encoded signals to the beam former 317. The beam former 317 inputs the signals outputted from the space-time block encoder 315 to perform beam forming of the signals by means of a beam corresponding to beam information provided by the decoder 319 and then transmits the beam-formed signals to the receiver 350 through the transmit antennas 321-1, ..., 321-$M_T$.

In the present invention, the beam former 317 transmits a reference signal such as a training signal, to which all beams available for the transmitter 300 are applied, at the first transmission. That is, since orthogonal codes are mapped on a one-to-one basis to all of the respective beams available for the transmitter 300, the beam former 317 performs beam forming of the reference signal by applying a corresponding beam and an orthogonal code mapped to the corresponding beam to the reference signal with respect to all the respective beams, and then transmits the beam-formed reference signal to the receiver 350. Then, the receiver 350 can detect an orthogonal code optimal to its own reception condition by applying all the respective orthogonal codes to processing of the received signals, and thus selects a beam corresponding to the detected orthogonal code as an optimum beam. Here, it goes without saying that a mapping relation between the corresponding beam and the corresponding orthogonal code is prearranged between the transmitter 330 and the receiver 350. Thus, the receiver 350 feeds back beam index information indicating the optimum beam to the transmitter 300, and thus the transmitter 300 can acquire the optimum beam information.

The decoder 319 decodes the beam information fed back from the receiver 350 and then outputs the decoded beam information to the beam former 317. The fed back beam information is beam index information, which will be described later in detail and thus details thereof will be omitted at this time for the sake of clarity. Also, it is noted that a signal reception path from the receiver 350 to the decoder 317 is not shown separately in the drawing.

Although the operation, in which the signals outputted from the modulator 313 is encoded in the STBC scheme by the space-time block encoder 315, has been described as essential in the above description, the signals outputted from the modulator 313 may be outputted not to the space-time block encoder 315 but directly to the beam former 317 when the optimum beam has been selected. That is, when the optimum beam has been selected, performance of the MIMO system can be sufficiently improved even if the STBC scheme is not applied, so it is obvious that the STBC scheme is optionally used. Moreover, by not using the STBC scheme, operation complexity can be reduced.

In a case where it is essential to encode the signals outputted from the modulator 313 in the STBC scheme by the space-time block encoder 315, the receiver 350 selects a beam, which exhibits a peak correlation value, but still has a correlation value below the orthogonal code associated with a maximum correlation value and a predetermined threshold correlation value from among the correlation values excluding the maximum correlation value, as a sub-optimum beam in addition to the optimum beam, and feeds back beam indexes indicating the optimum beam and the sub-optimum beam to the transmitter 300. An operation of selecting the optimum beam and the sub-optimum beam will be described later in detail, thus details thereof will not be given here for the sake of clarity. The transmitter 300 then performs beam forming of the signals outputted from the space-time block encoder 315 by applying beams corresponding to the optimum beam index and the sub-optimum beam index and transmits the beam-formed signals to the receiver 350 through the transmits antennas 321-1, ..., 321-$M_T$.

Noise such as additive white Gaussian noise (AWGN) is added to the signals transmitted from the transmitter 300 while the signals pass through a multipath channel and then the signals with the noises added thereto are received to the receiver 350 through the receive antennas 351-1, ..., 351-$M_R$. The signals received through the receive antennas 351-1, ..., 351-$M_R$ are transferred to the receive processor 353. The receive processor 353 performs processing of the received signals to output information on the optimum beam and the sub-optimum beam resulted from the processing of the received signals to the encoder 355. Here, in order to select the optimum beam from among all the beams available to the transmitter 300, the receive processor 353 applies predetermined orthogonal codes to the processing of the receive signals to detect an orthogonal code having the maximum correlation value. As stated above, the receive processor 353 selects a beam mapped to the orthogonal code having the maximum correlation value as the optimum beam, and also selects a beam, which exhibits a peak correlation value, but still has a correlation value below the orthogonal code associated with the maximum correlation value and a predetermined threshold correlation value from among the correlation values excluding the maximum correlation value, as the sub-optimum beam.

The encoder 355 maps the optimum beam information and the sub-optimum beam information outputted from the receive processor 353 to the predetermined beam indexes to transmit the mapped information to the transmitter 300. It is noted that a signal transmission path from the encoder 355 to the transmitter 300 is not shown separately in the drawing.

Hereinafter, a detailed description will be given for an operation of selecting the optimum beam and the sub-optimum beam, and an operation in which signals are processed correspondingly to the optimum and sub-optimum beams in the beam forming and STBC schemes and the processed signals are transmitted.

First, it is assumed that a channel between the transmitter 300 and the receiver 350 is a flat-fading channel and has a channel response characteristic as expressed by a channel matrix H in the following Equation 1:

$$H = \begin{bmatrix} h_{11} & h_{12} & \cdots & h_{1M_T} \\ h_{21} & h_{22} & \cdots & h_{2M_T} \\ \vdots & \vdots & \ddots & \vdots \\ h_{M_R1} & h_{M_R2} & \cdots & h_{M_RM_T} \end{bmatrix} \quad \text{Equation 1}$$

In Equation 1, $h_{M_RM_T}$ represents the channel response characteristic in a case where a signal transmitted through the $M_T$-th transmit antenna 321-$M_T$ is received through the $M_R$-th receive antenna 351-$M_R$. Also, it is assumed that when two serial symbols $s_0=s(t)$ and $s_1=s(t+T)$ are inputted, the space-time block encoder 315 generates a 2×2 sized block code S as expressed by the following Equation (2):

$$S = \begin{bmatrix} s_0 & s_1 \\ -s_1^* & s_0^* \end{bmatrix} \quad \text{Equation 2}$$

In Equation 2, the star * represents a complex conjugate operation, elements in each column of the block code S represent input symbol sequences in a corresponding time interval, and elements in each row correspond to any two beams which are different from each other, which are defined by the beam former 317. Here, an $M_T$×2 sized beam former, that is, the beam former 317 can be expressed by a beam forming matrix F in the following Equation 3:

$$F = \begin{bmatrix} f_{11} & f_{12} \\ f_{21} & f_{22} \\ \vdots & \vdots \\ f_{M_T1} & f_{M_T2} \end{bmatrix} \quad \text{Equation 3}$$

In Equation 3, $f_{M_T1}$ is a weighting value to be applied to a signal transmitted through the $M_T$-th transmit antenna 321-$M_T$ at an arbitrary time t and is used for creating a first beam, and $f_{M_T2}$ is a weighting value to be applied to a signal transmitted through the $M_T$-th transmit antenna 321-$M_T$ at an arbitrary time t+T and is used for creating a second beam.

The signal which the receiver 350 receives through the $M_R$ receive antennas can be expressed by an $M_R$×2 sized receive signal matrix R in the following Equation 4:

$$R = GS + N \quad \text{Equation 4}$$

In Equation 4, N represents an $M_R \times 2$ sized noise matrix, and G and R can be expressed by the following Equations 5 and 6:

$$G = HF = \begin{bmatrix} g_{11} & g_{12} \\ g_{21} & g_{22} \\ \vdots & \vdots \\ g_{M_T 1} & g_{M_T 2} \end{bmatrix} \quad \text{Equation 5}$$

$$R = \begin{bmatrix} r_{11} & r_{12} \\ r_{21} & r_{22} \\ \vdots & \vdots \\ r_{M_T 1} & r_{M_T 2} \end{bmatrix} \quad \text{Equation 6}$$

In Equations 5 and 6, $g_{k1}$ represents an effective channel between a 1-th beam and a k-th receive antenna, $r_{k1}$ represents a signal received through the k-th receive antenna at an arbitrary time t, that is, $r_{k1}=r_k(t)$, and $r_{k2}$ represents a signal received through the k-th receive antenna at an arbitrary time t+T, that is, $r_{k2}=r_k(t+T)$.

In particular, if $$f_{j1} = f_{k2} = \frac{1}{\sqrt{2}}$$

and $f_{m1}=f_{n2}=0$ in a case of $j \neq k$, $m \neq j$ and $n \neq k$, it is possible to realize the antenna processing scheme as a simple STBC scheme. Also, if the second column of the $M_R \times 2$ sized receive signal matrix R is 0, it is possible to realize the antenna processing scheme as a simple beam forming scheme. In addition, a maximum likelihood estimator in the receiver 350 can be expressed by the following Equation 7.

$$\hat{s}_0 = \sum_{k=1}^{M_R} (g_{k1}^* r_{k1} + g_{k2} r_{k2}^*); \text{ and} \quad \text{Equation 7}$$

$$\hat{s}_1 = \sum_{k=1}^{M_R} (g_{k1}^* r_{k2} - g_{k2} r_{k1}^*)$$

Here, when estimation of the channel matrix H need not be estimated for beam design, complexity in the channel estimation is significantly reduced. Also, the maximum likelihood estimator shown in Equation 7 can be expressed by the following Equation 8.

$$\hat{s}_0 = s_0 \sum_{k=1}^{M_R} |g_{k1}|^2 + |g_{k2}|^2 + v_{k1} = s_0 \sum_{k=1}^{M_R} \sum_{l=1}^{2} |h_k^T f_l|^2; \text{ and} \quad \text{Equation 8}$$

$$\hat{s}_1 = s_1 \sum_{k=1}^{M_R} |g_{k1}|^2 + |g_{k2}|^2 + v_{k2} = s_1 \sum_{k=1}^{M_R} \sum_{l=1}^{2} |h_k^T f_l|^2$$

In Equation 8, $h_k^T$ represents a channel row-vector of the channel matrix H, which is associated with the k-th receive antenna, $f_1$ represents the 1-th beam, and $v_{k1}$ and $v_{k2}$ represent AWGNs associated with the k-th antenna.

If no loss in signal transmission/reception is assumed, it is not necessary to consider AWGNs, $v_{k1}$ and $v_{k2}$ in estimating a cost function, so the cost function for the maximum likelihood estimators can be expressed by the following Equation 9.

$$\sum_{k=1}^{M_g} \sum_{l=1}^{2} |h_k^T f_l|^2 \text{ or } \|HF\|_F \quad \text{Equation 9}$$

In Equation 9, $\|\cdot\|_F$ represents a Frobenius norm. That is, optimizing beam forming is the same as detecting a beam forming matrix F maximizing $\|HF\|_F$, and the beam forming matrix F maximizing $\|HF\|_F$ can be detected as expressed by the following Equation 10.

$$\overset{\max}{F} \|HF\|_F = \overset{\max}{F} \left\| U \sum V^H F \right\|_F = \quad \text{Equation 10}$$

$$\left\| U \sum V^H F_{ideal} \right\|_F = \sigma_1^2 \text{ for } F_{ideal} = [v_1 \, 0]$$

In Equation 10, the channel matrix H has a relationship of $H = U \Sigma V^H$ by a singular value decomposition (hereinafter referred to as "SVD"), and an ideal beam forming matrix $F_{ideal}$ is generated by selecting an eigen vector corresponding to a maximum eigen value $\sigma_1$. The ideal beam forming matrix $F_{ideal}$ has a beam gain constant of $\alpha^2 + \beta^2 = 1$ and can be easily derived by maximizing the Frobenius norm for $F = [\alpha v_1 \, \beta v_2]$. When the ideal beam forming matrix $F_{ideal}$ is detected in the above-mentioned manner, performance of the MIMO wireless communication system is maximized because data transmission with maximum reliability can be performed even by using only one eigen vector. However, in an actual wireless channel environment, a problem exists because it is difficult to derive the ideal beam forming matrix $F_{ideal}$ in the above-mentioned manner due to operation complexity for the application of the SVD scheme, channel estimation errors and error of feedback channel information.

Therefore, the present invention proposes an optimum beam forming matrix $F_{OPT}$ which minimizes the operation complexity and the amount of the feedback channel information, but still has similar performance to that of the ideal beam forming matrix $F_{ideal}$. Also, in order to simplify optimum eigen vectors in the transmitter 300, it is assumed that a plurality of predefined f vectors are examined to select one vector capable of transmitting maximum energy to the receiver 350. That is, the optimum beam forming matrix $F_{OPT}$ is generated by approximating a radio channel of the MIMO wireless communication system to a dominant steering vector in the transmitter 300.

First, three steering vectors corresponding to a channel will be defined. Also, an impulse response vector of an MISO channel is given by superpositions of complex-weighted and delayed steering vectors. A set matrix of the steering vectors will be referred to as "W", and the steering vector set matrix W can be expressed by $a_k(\theta_k)$'s collected from a predetermined scenario. Here, k represents an index of the steering vector, and a simple scenario is one which has significance only when a direction of departure (hereinafter referred to as "DOD") $\Theta$ is in a range of $[\Theta_1 \leq \Theta \leq \Theta_2]$. An $M_T \times L$ sized steering vector set matrix W for sampling analysis of an angle $\Theta_s$ can be expressed by the following Equation 11:

$$W = [w_1 w_2 \ldots w_L] = [a_1(\theta_1) a_2(\theta_1 + \theta_s) a_3(\theta_1 + 2\theta_s) \ldots a_L(\theta_1 + (L-1)\theta_s)] \quad \text{Equation 11}$$

In Equation 11, θ refers to an angle of a transmitted signal.

It should be noted that steering vectors for signals transmitted directions other than a desired transmission direction, that is, the DOD are not considered at all in Equation 11. Also, it is possible to apply a scenario consisting of $[\Theta_1 \leq \Theta \leq Q_2] \cap [\Theta_3 \leq \Theta \leq Q_4]$ for signals transmitted in other direction than the DOD, that is, $[\Theta_2 \leq \Theta \leq Q_3]$.

Next, a scheme for selecting an optimum steering vector in the steering vector set matrix W will be described.

In order to select optimum steering vector in the steering vector set matrix W, signal energy for each signal, which the transmitter 300 transmits while applying each transmit beam, must be measured on the receiver side 350. The present invention proposes a scheme in which orthogonal codes are used for discerning the respective transmit beams, which the transmitter 300 applies, from each other on the receiver side 350. That is, according to present invention, the transmitter 300 transmits the respective transmit beams applied therein while multiplying them by different orthogonal codes from each other, thereby enabling the receiver 350 to discern the respective transmit beams from each other. Here, the orthogonal codes can be expressed by an L×L sized orthogonal code matrix C, and thus the signals received to the receiver 350 through the $M_R$ receive antennas can be expressed by the following Equation 12.

$$R = GC + N \qquad \text{Equation 12}$$

In Equation 12, G represents an effective channel between the 1-th beam and the k-th receive antenna and simultaneously represents HW having $g_{k1}$ (where G=HW), and N represents an $M_R \times L$ sized noise matrix. Here, a steering vector, which is the most suitable to the effective channel, can deliver maximum energy to the receiver 350. The steering vector, which is the most suitable to the effective channel, can be detected on the receiver side 350 by multiplying the orthogonal code matrix C by a Hermitian matrix of the receive signal matrix R and then comparing the sizes of corresponding transmit beams with each other. That is, a beam quality matrix T for evaluating the qualities of L transmit beams can be expressed by the following Equation 13.

$$T = CR^H = G^H + V \qquad \text{Equation 13}$$

In Equation 13, G represents an effective channel matrix, and V represents an associated Gaussian noise matrix. As a result of this, an optimum beam $f_{OPT}$ delivering the maximum energy can be expressed by the following Equation 14.

$$f_{OPT} = w_m, \quad m = \arg\max_k \sum_j |t_{kj}| \qquad \text{Equation 14}$$

In Equation 14, $t_{kj}$ represents energy for a signal transmitted through a k-th transmit beam and received through a j-th receive antenna, and m represents a beam index.

The receiver 350 determines the optimum beam in such a manner as presented in Equation 14 and feeds back a beam index m indicating the optimum beam to the transmitter 300, thereby controlling the transmitter 300 such that it transmits signals to the receiver 300 while applying a beam corresponding to the beam index m, which indicates the optimum beam, to the signals. As an example, if a received signal, to which an arbitrary beam forming vector f is applied, is r, a receive signal vector r can be expressed by the following Equation 15:

$$r = gs + n \qquad \text{Equation 15}$$

In Equation 15, the receive signal vector r is $r = [r_{11} r_{21} \ldots r_{M_R 1}]^T$, and g represents an effective channel vector. Here, T signifies transpose operation.

Also, the maximum likelihood estimator can be expressed by the following Equation 16:

$$\hat{s} = \sum_{k=1}^{M_R} g_k^* r_k = g^H r \qquad \text{Equation 16}$$

As shown in Equation 16 for the maximum likelihood estimator, channel estimation complexity for the effective channel vector g is reduced by the number of the transmit antennas.

The size of the feedback information, that is, the beam index information can be minimized by reducing the set of the steering vectors. As an example, if the number of beams applied in the transmitter is reduced from 32 to 16, the number of bits necessary for feeding back the beam index information is reduced from 5 bits to 4 bits. However, since reduction in the number of bits necessary for feeding back the beam index information results in reducing the number of beams applied in the transmitter, a kind of inverse relation is established between the number of bits necessary for feeding back the beam index information and the number of beams applied in the transmitter. Thus, it is preferable to select numbers which are suitable for the applied MIMO wireless communication system.

Up to now, a description has been given for a case where the receiver 350 selects a beam optimal to its own signal reception and feeds back a beam index indicating the selected beam to the transmitter 300, thereby causing the transmitter to apply a beam corresponding to the beam index to signals and then transmit the signals to the receiver 350.

Meanwhile, as also stated above, the STBC scheme exists as another scheme for enhancing reliability of data transmission between the transmitter 300 and the receiver 350. If a combined scheme including the beam forming scheme and the STBC scheme is used when the beam forming scheme when used alone does not provide a performance level which is compatible with its potential for any reason, the reliability of data transmission can be enhanced. Since the STBC scheme requires at least two beams as stated above, the user terminal must determine a beam having good reception performance next to the optimum beam, that is, a sub-optimum beam and also feeds back a beam index indicating the sub-optimum beam to the transmitter. Here, a way to select the sub-optimum beam is the same as that for the optimum beam, but the sub-optimum beam must be selected in such a manner that it has almost no correlation with the optimum beam and thus can provide spatial diversity. A sub-optimum beam forming matrix for combination with the STBC scheme can be expressed by the following Equation 17.

$$F_{SUB} = [\alpha f_{SUB\text{-}OPT1} \, \beta f_{SUB\text{-}OPT2}] \qquad \text{Equation 17}$$

In Equation 17, α and β satisfy a relationship of $\alpha^2 + \beta^2 = 1$, and can be determined by energy detected in the receiver 350. For the convenience of explanation, $$\alpha = \beta = \frac{1}{\sqrt{2}}$$

is assumed in the present invention (provided that there is no line of sight (LOS) on a radio channel). Also, $f_{SUB-OPT1}$ and $f_{SUB-OPT2}$ in Equation 17 can be expressed by the following Equations 18 and 19.

$$f_{SUB-OPT1} = w_m, m - \arg\max_k \sum_j |t_{kj}| \quad \text{Equation 18}$$

$$f_{SUB-OPT2} = w_n, n = \arg\max_{k \neq m} \sum_j |t_{kj}|, corr(w_n, w_n) < \rho_T \quad \text{Equation 19}$$

In Equation 19, $\rho_T$ is a correlation threshold value, which is predetermined correspondingly to characteristics of the wireless communication system, and is less than 0, that is, $\rho_T < 1$.

In FIG. 3, the structure of the MIMO wireless communication system employing the STBC-beam forming scheme, which performs various functions in accordance with the preferred embodiment of the present invention, has been described. Next, the energy level of a received signal according to DOAs will be described with reference to FIG. 4.

Figure 4:
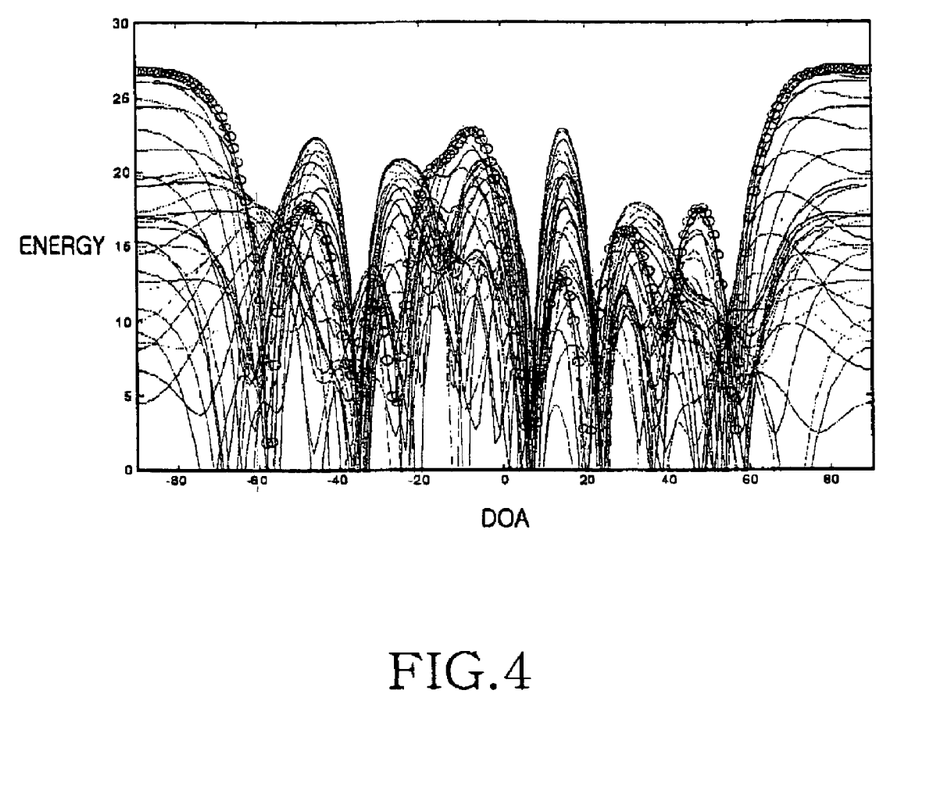
FIG. 4 is a graph illustrating energy levels of received signals as a function of a direction of arrival (DOA)

FIG. 4 is a graph illustrating energy levels of received signals as a function of a DOA.

The energy levels of received signals according to the DOAs are those showing up when four antennas and 32 beams ($-70° < \Theta < +70°$) are used in a transmitter and a channel environment is a rich scattering channel environment. In the present invention, since the respective beams are transmitted while orthogonal codes are mapped on a one-to-one basis thereto, the energy levels of the received signals can be detected for the respective beams Equations 12 and 13.

In FIG. 4, the energy level of a received signal according to the DOAs has been described. Next, a description will be given for beams having a maximum energy level from among the energy levels shown in FIG. 4 with reference to FIG. 5.

Figure 5:
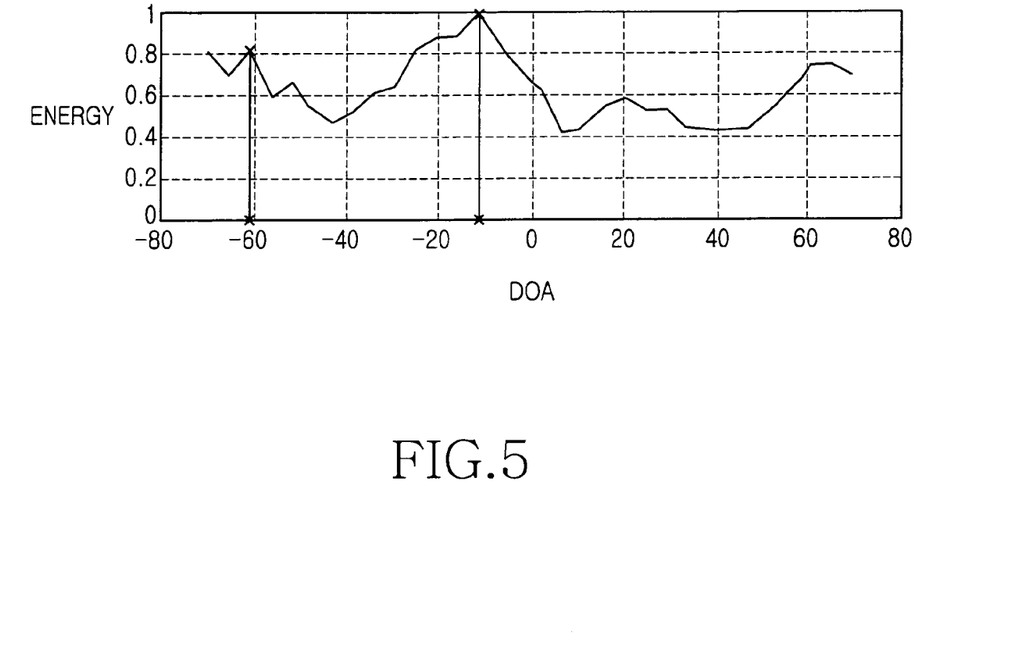
FIG. 5 is a graph illustrating beams having a maximum energy level from among the energy levels shown in FIG. 4.

FIG. 5 is a graph illustrating beams having a maximum energy level from among the energy levels shown in FIG. 4.

The beams in FIG. 5, which have the maximum energy level from among the energy levels shown in FIG. 4, represents those having DOAs of (−62°, −10°). In FIG. 5, the beams having the maximum energy level from among the energy levels shown in FIG. 4 has been described. Next, beams selected from 32 beams shown in FIG. 4 will be described with reference to FIG. 6.

Figure 6:
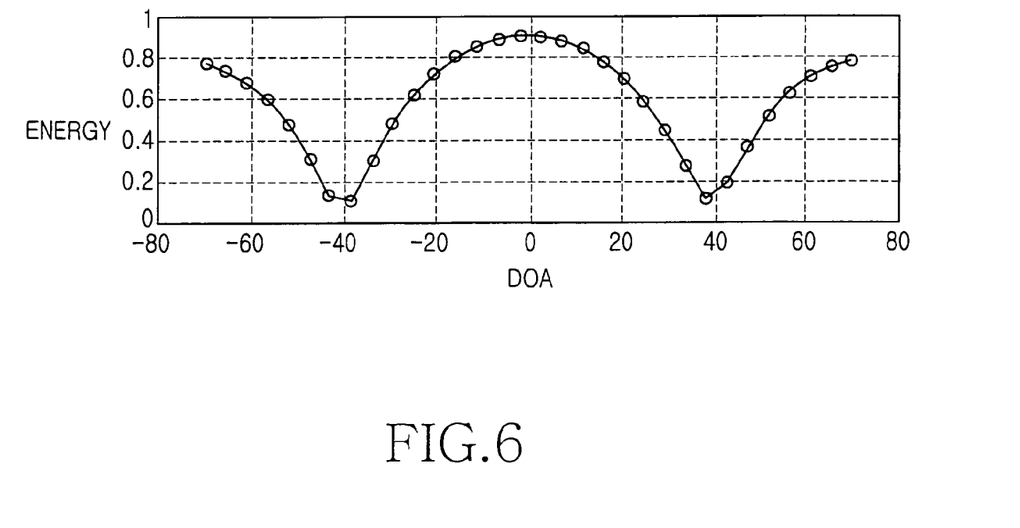
FIG. 6 is a graph illustrating beams selected from 32 beams shown in FIG. 4.

FIG. 6 is a graph illustrating correlation values between an eigen vector of a channel and 32 beams shown in FIG. 4. As seen from FIG. 6, the DOAs of the two beams selected in FIG. 5 are close to those of maximums shown in FIG. 6. The beams in FIG. 5 are the same as those having maximum energy levels in FIG. 4.

In FIG. 6, the beams selected from 32 beams in FIG. 4 has been described. Next, a description will be given for an optimum beam and a sub-optimum beam selected in a case of employing an STBC-beam forming scheme in the MIMO wireless communication system with reference to FIG. 7.

Figure 7:
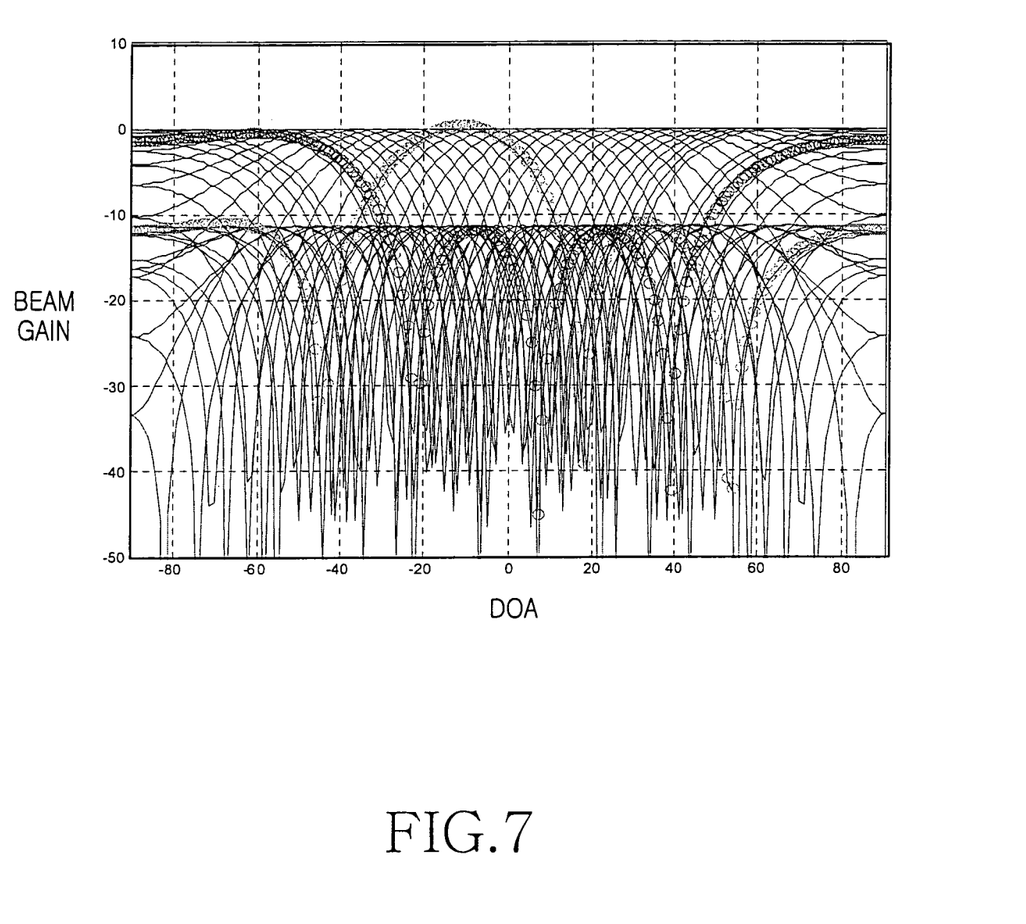
FIG. 7 is a graph illustrating an optimum beam and a sub-optimum beam selected in a case of employing an STBC-beam forming scheme in an MIMO wireless communication system according to the present invention.

FIG. 7 is a graph illustrating an optimum beam and a sub-optimum beam selected in a case of employing an STBC-beam forming scheme in an MIMO wireless communication system according to the present invention.

In FIG. 7, it is assumed that four antennas and 32 beams ($-70° < \Theta < +70°$) are used in a transmitter, a channel environment is a rich scattering channel environment and a correlation threshold value $\rho_T$ between the optimum beam and the sub-optimum beam is 0.7 ($\rho_T = 0.7$). In this case, the optimum beam and the sub-optimum beam have DOAs of ((−62°, −10°) as shown in FIG. 7.

In FIG. 7, a description has been given for the optimum beam and the sub-optimum beam selected in a case of employing the STBC-beam forming scheme in the MIMO wireless communication system. Next, performance of the beam forming scheme proposed in the present invention and conventional beam forming schemes will be comparatively described with reference to FIG. 8.

Figure 8:
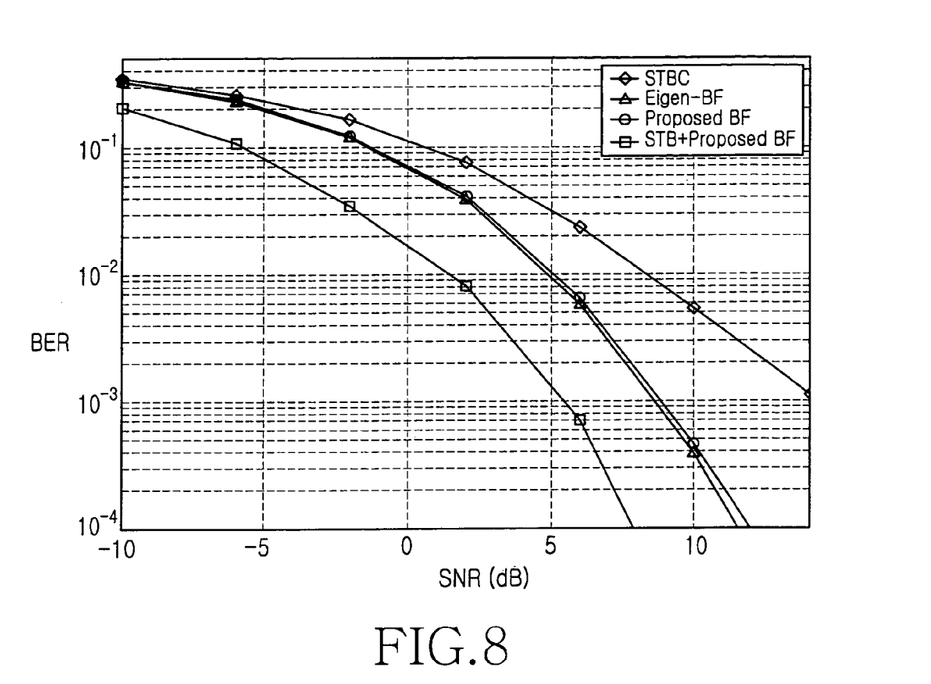
FIG. 8 is a graph illustrating performance comparison between a beam forming scheme according to the present invention and common beam forming schemes.

FIG. 8 is a graph illustrating performance comparison between the beam forming scheme according to the present invention and conventional beam forming schemes.

The performance graphs shown in FIG. 8 are those derived on the assumption that an antenna system is a uniform linear array (ULA) in which antennas are spaced at intervals of 0.5λ, and a channel environment is a rich scattering channel environment. Here, since the rich scattering channel environment is considered, a flat-fading channel environment, in which there is no LOS and a high angular spread characteristic is provided, is assumed as the channel environment in FIG. 8. In FIG. 8, it is also assumed that a binary phase shift keying scheme is used as a modulation scheme, the number of transmit antennas is 4 and the number of receive antennas is 1.

FIG. 8 illustrates a performance graph in a case of using only a common STBC scheme, a performance graph in a case of using an eigen-beam forming scheme (eigen-BF scheme), a performance graph in a case of using the beam forming scheme according to the present invention (BF scheme) and a performance graph in a case of using a combined scheme of the STBC scheme and the BF scheme according to the present invention (i.e., the STBC+BF scheme). As shown in FIG. 8, the BF scheme according to the present invention may acquire a higher diversity gain than that of the conventional STBC scheme, but causes a loss in array gain as compared with the eigen-BF scheme. This is because the BF scheme according to the present invention designs beams while ignoring other important beams. However, considering the LOS channel model, the loss in array gain can be minimized. The BF scheme according to the present invention is an excellent alternative to the eigen-BF scheme in view of operation complexity and data transmission reliability.

As shown in FIG. 8, there is almost no difference in performance between the BF scheme according to the present invention and the combined scheme including the STBC scheme and the BF scheme according to the present invention. This is because energies of two beams selected for the STBC scheme, that is, energies of the optimum beam and the sub-optimum beam are almost the same as each other.

In FIG. 8, performances of the propose BF scheme and the common beam forming schemes have been comparatively described. Next, a description will be given for performance comparison of the propose BF scheme according to the number of beams applicable to a transmitter, that is, the number of feedback bits with reference to FIG. 9.

Figure 9:
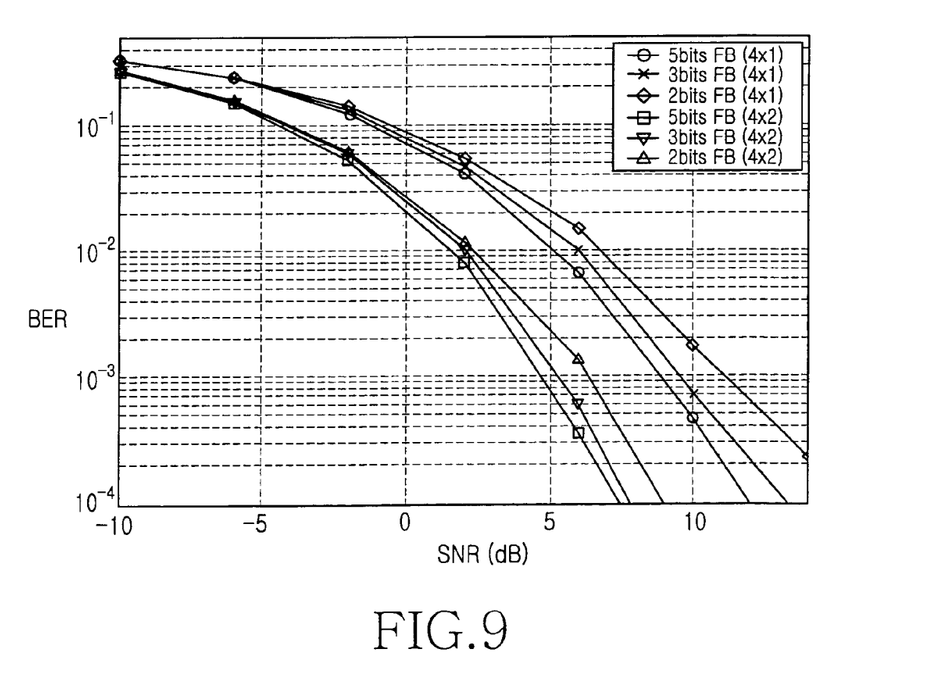
FIG. 9 is a graph illustrating performance comparison of a beam forming scheme according to the present invention according to the number of beams applicable to a transmitter.

FIG. 9 is a graph illustrating performance comparison of the BF scheme according to the present invention according to the number of beams applicable to a transmitter.

FIG. 9 illustrates a performance graph according to the number beams in a case where the number of transmit antennas is 4 and the number of receive antennas is 1, and a performance graph according to the number beams in a case where the number of transmit antennas is 4 and the number of receive antennas is 2. As shown in FIG. 9, on the assumption that the number of transmit antennas is maintained constant in the two cases, performance is enhanced with increase in the number of beams applicable to the transmitter.

In FIG. 8, performance comparison of the BF scheme of the present invention according to the number of beams applicable to a transmitter has been described. Finally, performances of the propose BF scheme and a combined scheme of the propose BF scheme and an STBC scheme will be comparatively described with reference to FIG. 10.

Figure 10:
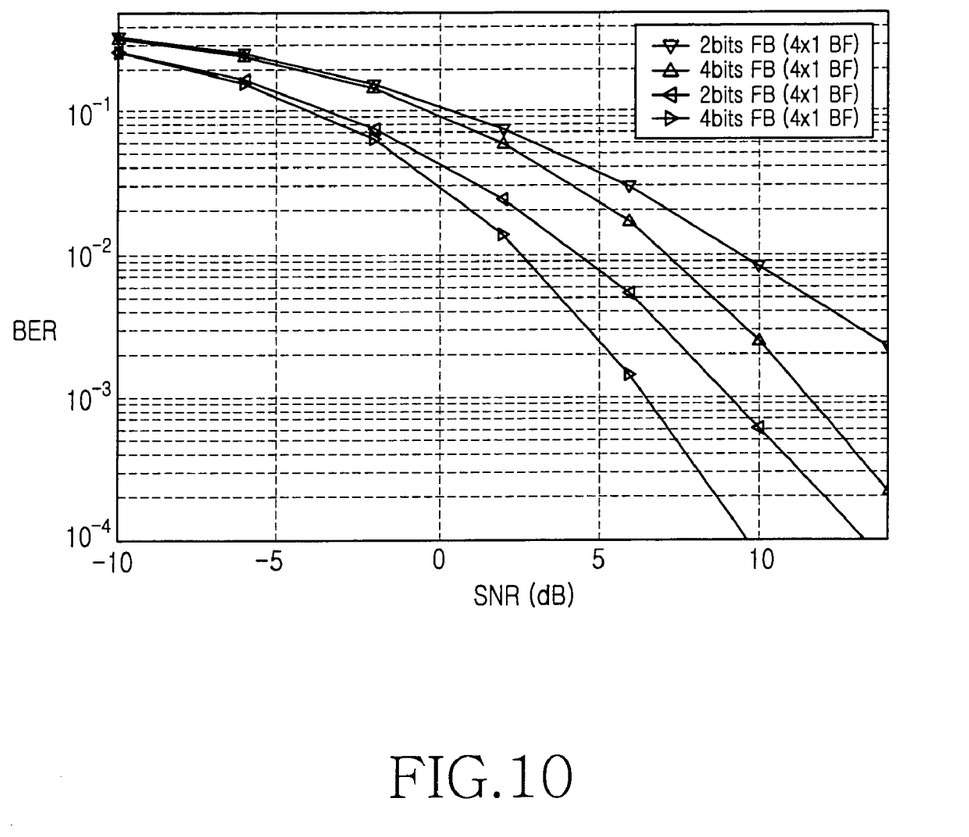
FIG. 10 is a graph illustrating performance comparison between a beam forming scheme proposed in the present invention and a combined scheme of an STBC scheme and the beam forming scheme according to the present invention.

FIG. 10 is a graph illustrating performance comparison between the BF scheme and a combined scheme of an STBC scheme and the BF scheme according to the present invention.

FIG. 10 illustrates graphs representing performances of the BF scheme and graphs representing performances of the combined scheme according to the present invention on the assumption that serious errors in beam selection occur in a receiver. As shown in FIG. 10, when errors in beam selection occur in the receiver, using the combined scheme is better than using the BF scheme alone in view of performance enhancement. Of course, when the combined scheme of the STBC scheme and the BF scheme is used, the number of feedback bits increases as compared with in a case of using only the propose BF scheme.

As described above, the present invention has an advantage in that a transmitter performs beam forming of signals by using a beam corresponding to an optimum beams capable of maximizing reception performance in a receiver and then transmits the beam-formed signals to the receiver in an MIMO/MISO wireless communication system, thereby enhancing the reception performance of the receiver. The present invention discerns transmit beams from each other by using orthogonal codes in an MIMO wireless communication system, and thus has a further advantage in that the optimum beam can be detected only by a relatively simple operation. Moreover, in a case of employing a combined scheme of a beam forming scheme and an STBC scheme, the present invention can maximizes the reception performance of the receiver by using a sub-optimum beam as well as the optimum beam.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting signals by using a beam forming scheme and an space-time block coding (STBC) scheme in a transmitter of an multiple input multiple output/multiple input single output (MIMO/MISO) wireless communication system, the method comprising:

performing beam forming of a reference signal by applying a plurality of beams available for the transmitter mapped to orthogonal codes on a one-to-one basis to the reference signal to transmit the beam-formed reference signal to a receiver;

receiving information on an optimum beam and a sub-optimum beam, to maximize reception performance, from the receiver;

encoding data signals in the STBC scheme to perform beam forming of the encoded data signals by using beams corresponding to the information on the optimum beam and the sub-optimum beam; and transmitting the beam-formed data signals to the receiver, wherein the optimum beam is a beam which is mapped to a first orthogonal code exhibiting a maximum correlation value from among correlation values of orthogonal codes applied to processing of the reference signal received in the receiver and the sub-optimum beam is a beam which is mapped to a second orthogonal code exhibiting a peak correlation value and having a correlation value below the first orthogonal code and a predetermined threshold correlation value from among the correlation values excluding the maximum correlation value.

2. An apparatus for transmitting signals by using a beam forming scheme and an space-time block coding (STBC) scheme in a transmitter of an multiple input multiple output/multiple input single output (MIMO/MISO) wireless communication system, the apparatus comprising:

a space-time block encoder for encoding data signals in the STBC scheme;

a beam former for performing beam forming of a reference signal by applying a plurality of beams available for the transmitter mapped to orthogonal codes on a one-to-one basis to the reference signal to transmit the beam-formed reference signal to a receiver, and performing beam forming of the STBC-encoded data signals by using beams corresponding to information on an optimum beam and information on a sub-optimum beam, which are received from the receiver, to transmit the beam-formed data signals to the receiver; and a decoder for receiving signals from the receiver to decode, decoding the received signals and transmitting the information on the optimum beam and the sub-optimum beam, to maximize reception performance, to the beam former, wherein the optimum beam is a beam which is mapped to a first orthogonal code exhibiting a maximum correlation value from among correlation values of orthogonal codes applied to processing of the reference signal received in the receiver and the sub-optimum beam is a beam which is mapped to a second orthogonal code exhibiting a peak correlation value and having a correlation value below the first orthogonal code and a predetermined threshold correlation value from among the correlation values excluding the maximum correlation value.

3. A method for receiving signals transmitted using a beam forming scheme and an space-time block coding (STBC) scheme in a receiver of an multiple input multiple output/multiple input single output (MIMO/MISO) wireless communication system, the method comprising:

in response to receiving a reference signal, correlating the reference signal with predetermined codes pre-mapped on a one-to-one basis to a plurality of beams available for the transmitter;

selecting a beam mapped to a first predetermined code, which has a maximum correlation value from among correlation values correlated with respect to the predetermined codes, as an optimum beam, and selecting a beam mapped a second predetermined code, which exhibits a peak correlation value and has a correlation value below the first predetermined code and a predetermined threshold correlation value from among the correlation values excluding the maximum correlation value, as a sub-optimum beam; and feeding back information representing the selected optimum beam and sub-optimum beam to the transmitter.

4. The method as claimed in claim 3, wherein the predetermined codes are orthogonal codes.

5. An apparatus for receiving signals transmitted using a beam forming scheme and an space-time block coding (STBC) scheme in a receiver of an multiple input multiple output/multiple input single output (MIMO/MISO) wireless communication system, the apparatus comprising:

a receive processor for receiving a reference signal from a transmitter to correlate the reference signal with predetermined codes pre-mapped on a one-to-one basis to a plurality of beams available for the transmitter, selecting a beam mapped to a first predetermined code, which has a maximum correlation value from among correlation values correlated with respect to the predetermined codes, as an optimum beam and selecting a beam mapped a second predetermined code, which exhibits a peak correlation value and has a correlation value below the first predetermined code and a predetermined threshold correlation value from among the correlation values excluding the maximum correlation value, as a sub-optimum beam; and an encoder for feeding back information representing the selected optimum beam and sub-optimum beam to the transmitter.

6. The apparatus as claimed in claim 5, wherein the predetermined codes are orthogonal codes.

* * * * *